UNITED STATES PATENT OFFICE.

GEORGE KNOCK, OF CLEVELAND, OHIO.

PROCESS OF PACKING FILTERS.

No. 867,733.　　　　　　Specification of Letters Patent.　　　　　　Patented Oct. 8, 1907.

Application filed April 8, 1907. Serial No. 366,936.

*To all whom it may concern:*

Be it known that I, GEORGE KNOCK, a citizen of the United States, residing at Cleveland, in the county of Cuyahoga and State of Ohio, have invented a certain new and useful Improvement in Processes of Packing Filters, of which the following is a full, clear, and exact description, reference being had to the accompanying drawings.

An application of mine filed contemporaneously herewith and numbered 366,937 shows a filter having a tank, and having perforated members providing intakes and exits and suitable packing between the members, such packing consisting of pulp or similar material. In the operation of such filter, when used for filtering beer for example, the liquid is forced under pressure through the pulp. In such cases it is very essential to have the filter material spread evenly and compactly so that there may be no weak spots, for if such spot should develop, it would provide a path at least resistance for the beer and rapidly increase in size, allowing the beer to pass unfiltered, destroying the effectiveness of the filter.

In order to pack the filtering material evenly and without weak spots, I have discovered that if it be placed in the tank while certain of the perforated members are in place and suction be maintained through those members, the evenness of the packing is greatly increased. This results from the fact that weak spots, where the packing is not as thick as elsewhere, receive a larger proportion of the force of the suction and such increased suction through this point acting on this wet pulp rapidly draws the material together and closes such opening, rendering the packing compact and even. This operation, constituting the present invention, is illustrated herein as applied to a filter of the type shown and more fully described in my application referred to.

Figure 1:
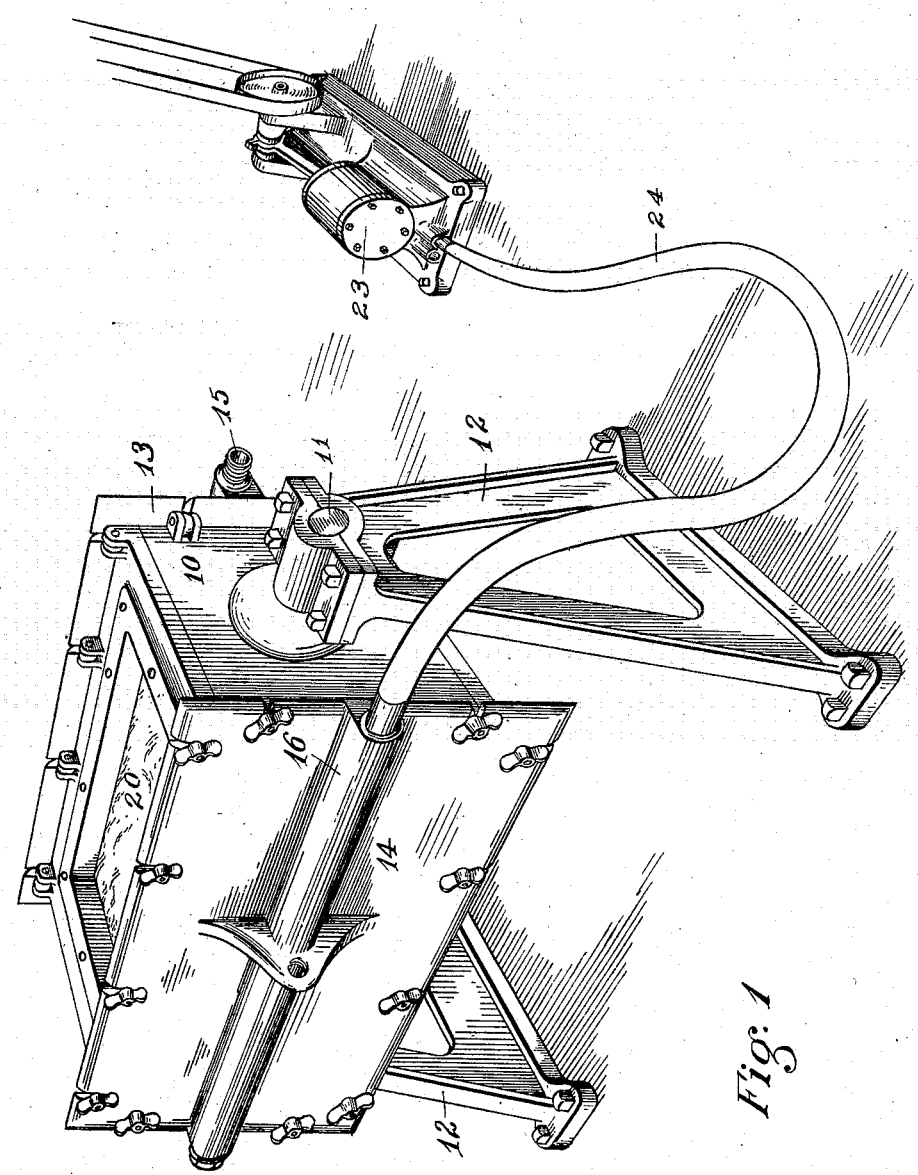
Figure 2:
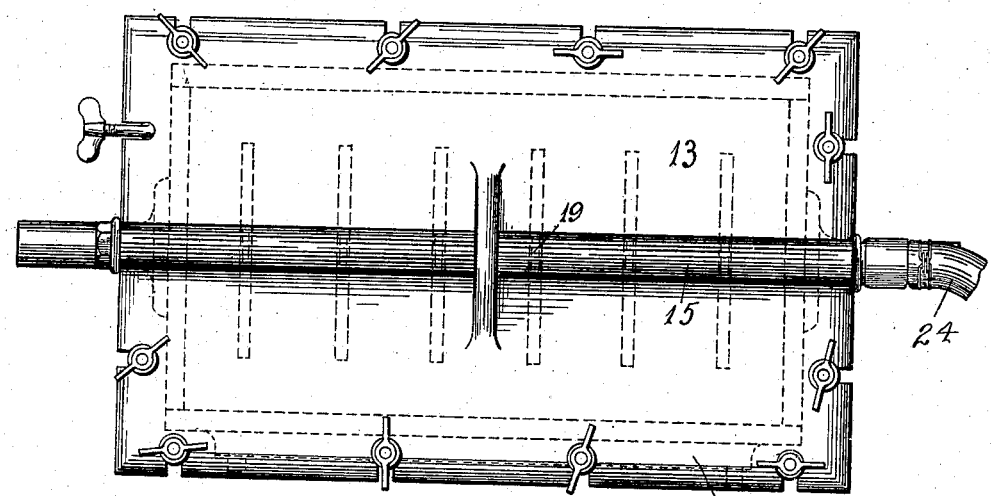
Figure 3:
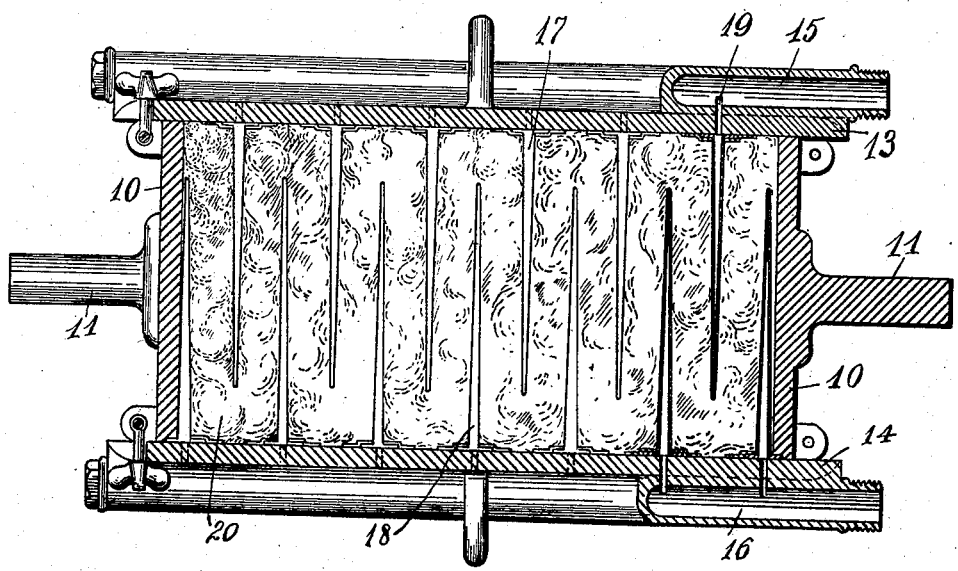

As shown in the drawings, Figure 1 is a perspective view of the filter together with a suction pump showing the operation of packing the filter. Fig. 2 is a plan of the filter, and Fig. 3 is a longitudinal section thereof.

In the filter illustrated in the drawings, there is a tank or body having two of its opposite sides open and having projecting from its ends 10, trunnions 11 by which it is supported in standards 12. The open sides are closed by covers 13 and 14 held at these sides by suitable bolts and nuts. These covers carry intake and exit conduits 15 and 16. On the inner sides of the covers are wedge-shaped hollow orifice members 17 and 18 which connect with the corresponding conduits by suitable ports 19 through the covers. 20 represents packing of pulp or other filtering material between the wedge shaped perforated members and extending around their ends.

One of the sides of the tank has an opening which is closed during use by a manhole cover 22 shown in dotted lines in Fig. 2. To pack the filter, the other parts being in place, the manhole cover is removed and that side of the filter is turned uppermost, as shown in Fig. 1. The wet filter pulp is inserted through this cover while suction is maintained on the pipe 16, the means for such suction being conventionally illustrated by the pump 23 and hose 24. Throughout the placing of the pulp this suction is maintained until the filter is entirely packed and the manhole cover replaced.

The suction through the perforated members during the placing of the packing is the essential feature of this invention, for such suction draws the packing immediately against or toward the corresponding perforated members. As further packing is inserted, it is acted upon by the suction, the suction being greatest where the prior packing is less, so that such additional packing comes immediately to a stop where it is needed. In this way the filter is packed, the filter material being added gradually and being continually drawn by the suction to the weakest point in the existing packing, the result being that when the filter is entirely packed, it is homogeneous throughout and there are no weak points where the pressure on the liquid in operation might force a gap in the filter medium or destroy its efficiency.

Having thus described my invention, I claim:

1. The process of packing a filter consisting of maintaining a suction through the porous filter material while such filter material is being placed.

2. The process of packing a filter which consists in supplying moist filter material to the filter while maintaining a suction from the receptacle.

3. The process of packing a filter consisting of maintaining a suction through the porous filter material while such filter material is being placed, and placing such material gradually.

4. The process of packing a filter having a perforated member, and filter material adjacent thereto, consisting in maintaining a suction through such member while placing the filter material about it.

5. The process of packing a filter having a perforated member, and filtering pulp adjacent thereto, consisting in maintaining a suction through such member while gradually placing the pulp about it.

6. The process of packing a filter having a tank, and an internal perforated orifice member, consisting of maintaining a suction through such orifice member and at the same time placing moist filter material about such member, the suction drawing the filter material evenly into place.

In testimony whereof, I hereunto affix my signature in the presence of two witnesses.

GEORGE KNOCK.

Witnesses:
　J. B. HULL,
　WILLIAM PLATZ.